United States Patent [19]
Yamazaki et al.

[11] Patent Number: 4,778,119
[45] Date of Patent: Oct. 18, 1988

[54] MAGNETIC TAPE WIND-UP METHOD AND APPARATUS

[75] Inventors: Tsuneo Yamazaki; Tomoki Saito; Takashi Hasegawa, all of Odawara, Japan

[73] Assignee: Fuji Photo Film Co., Ltd., Japan

[21] Appl. No.: 890,386

[22] Filed: Jul. 28, 1986

[30] Foreign Application Priority Data

Jul. 30, 1985 [JP] Japan .................................. 60-168325

[51] Int. Cl.⁴ ............................................ B65H 16/02
[52] U.S. Cl. ............................... 242/67.1 R; 226/190; 242/76
[58] Field of Search .................... 242/67.1 R, 76, 67.2, 242/78.7; 226/190

[56] References Cited

U.S. PATENT DOCUMENTS

| | | | |
|---|---|---|---|
| 1,807,274 | 5/1931 | Beidler | 242/76 |
| 3,306,548 | 2/1967 | Dolder | 242/76 X |
| 3,387,798 | 6/1968 | Young | 242/76 |
| 3,602,448 | 8/1971 | Muensterer | 226/67.1 R X |
| 3,606,127 | 1/1969 | Brown | 226/190 |
| 4,004,747 | 1/1977 | Schulze | 242/67.2 X |
| 4,335,857 | 6/1982 | Pfost | 242/76 X |
| 4,343,440 | 8/1982 | Engl | 242/67.1 R |
| 4,440,359 | 4/1984 | Nelson | 242/190 X |
| 4,504,026 | 3/1985 | Serizawa | 242/67.1 R X |

FOREIGN PATENT DOCUMENTS 1247508 9/1971 United Kingdom ........... 242/67.1 R

Primary Examiner—Stanley N. Gilreath
Assistant Examiner—Katherine Matecki
Attorney, Agent, or Firm—Pasquale A. Razzano

[57] ABSTRACT

In a magnetic tape wind-up system for winding up a magnetic tape into a roll shape around a wind-up core, a feed direction of the magnetic tape to a tape roll, which is formed by winding up of a preceding portion of the magnetic tape, is controlled by a position control roller before the magnetic tape arrives at the tape roll. The position of the magnetic tape in the tape width direction is controlled by an edge control roller at a position where the magnetic tape arrives at the tape roll. Air between turns of the magnetic tape in the tape roll is discharged by pushing the magnetic tape against the tape roll by use of a push roller while the magnetic tape is present at the outermost circumference of the tape roll.

14 Claims, 2 Drawing Sheets

MAGNETIC TAPE WIND-UP METHOD AND APPARATUS

BACKGROUND OF THE INVENTON

1. Field of the Invention

This invention relates to a magnetic tape wind-up method for winding a magnetic tape around a wind-up core in a roll shape, and an apparatus for carrying out the method. This invention particularly relates to a magnetic tape wind-up method wherein a magnetic tape is quickly wound up around a wind-up core into a large diameter roll in an aligned winding appearance, and an apparatus for carrying out the method.

2. Description of the Prior Art

In processes for making a magnetic tape such as a video tape, the magnetic tape is cut by a slitter to a predetermined width, and wound up around a wind-up core having no flange, which is generally called the pancake. The magnetic tape wound up around the wind-up core is then rewound around a plurality of tape reels and used in cassettes or the like.

When the magnetic tape is wound up around the wind-up core as described above, it is desired to wind as long a tape as possible around the wind-up core, i.e. into a roll having as large a diameter as possible. Also, in order to efficiently winding up the magnetic tape around the wind-up core, the wind-up speed should be as high as possible. The possibility of increasing the diameter of the magnetic tape roll wound up around the wind-up core and the wind-up speed depends on the decorative winding accuracy for aligning the appearance of the tape roll wound up around the wind-up core. Specifically, when the decorative winding accuracy is low, disturbance of winding appearance of the magnetic tape arises if the speed of winding up the magnetic tape is increases. Also, if the magnetic tape is wound up into a large diameter roll, disturbance of the winding appearance arises at a larger diameter section of the roll, and the roll of the magnetic tape wound around the wind-up core readily deforms. In order to achieve decorative winding of the magnetic tape at a high accuracy around the wind-up core, it is necessary to feed the magnetic tape accurately in a predetermined direction with respect to the wind-up surface of the wind-up core and to control the position of the magnetic tape in the width direction so that the side edges of respective turns of the wound-up magnetic tape align. Further, when air is confined between the respective turns of the wound-up magnetic tape, the respective turns of the wound-up magnetic tape readily slide against each other, and the roll of the magnetic tape wound-up readily deforms Therefore, it is necessary to sufficiently discharge confined air.

FIG. 3 is a schematic plan view showing the conventional magnetic tape wind-up apparatus. In the conventional magnetic tape wind-up apparatus, a magnetic tape 1 is wound up around a wind-up core 3 rotated in the direction as indicated by the arrow A. The magnetic tape 1 is fed via a guide roller 2, and the position of the magnetic tape 1 is controlled only by a touch roller 13 which is urged by a spring or the like (not shown) to resiliently push the magnetic tape 1 against a tape roll 1' previously formed around the wind-up core 3 at the position where the magnetic tape 1 reaches the tape roll 1'. That is, the touch roller 13 must simultaneously effect both the control of the position of the magnetic tape 1, the position of which has been restricted to some extent by the guide roller 2, in the width direction thereof and air discharging from spaces between respective turns of the tape roll 1'. Therefore, in the conventional apparatus merely provided with the touch roller 13, it is not always possible to substantially improve the decorative winding accuracy of the magnetic tape and to increase the diameter of the magnetic tape roll and the wind-up speed. Particularly, as the magneiic tape has been improved in recent years, magnetic tapes which are very thin and have smooth surfaces are now widely used. The thin magnetic tapes readily bend or deform during tape winding. Also, the magnetic tapes having smooth surfaces slide more readily than conventional magnetic tapes, and the tape roll deforms readily when even a very small amount of air is present between the respective turns of the tape roll. Therefore, with the conventional wind-up technique, it is not always possible to satisfactorily wind up the magnetic tapes which are thin and/or have smooth surfaces.

SUMMARY OF THE INVENTION

The primary object of the present invention is to provide a magnetic tape wind-up method which improves the accuracy of decorative winding of a magnetic tape around a wind-up core.

Another object of the present invention is to provide a magnetic tape wind-up method wherein the speed of winding up a magnetic tape is increased and the diameter of the wound-up magnetic tape roll is increased.

The specific object of the present invention is to provide an apparatus for carrying out the method.

The present invention provides a magnetic tape windup method for winding up a method tape into a roll shape around a wind-up core, which comprises the steps of:

(i) controlling a feed direction of said magnetic tape to a tape roll, which is formed by winding up of a preceding portion of said magnetic tape around said wind-up core, by a position control roller before said magnetic tape arrives at said tape roll, (ii) controlling the position of said magnetic tape in the tape width direction by an edge control roller at a position where said magnetic tape arrives at said tape roll, and (iii) discharging air between turns of said magnetic tape in said tape roll by pushing said magnetic tape against said tape roll by use of a push roller while said magnetic tape is present at the outermost circumference of said tape roll.

The present invention also provides a magnetic tape wind-up apparatus for winding up a magnetic tape into a roll shape around a wind-up core, which comprises:

(i) a position control roller for contacting said magnetic tape and controlling a feed direction of said magnetic tape to a tape roll, which is formed by winding up of a preceding portion of said magnetic tape around said wind-up core, at a position prior to arrival of said magnetic tape at said tape roll, (ii) an edge control roller for contacting said magnetic tape at an arrival position of said magnetic tape at said tape roll and controlling the position of said magnetic tape in the tape width direction, and (iii) a press roller for pushing said magnetic tape against said tape roll and discharging air between turns of said magnetic tape in said tape roll while said magnetic tape is present at the outermost circumference of said tape roll.

In the present invention, for a magnetic tape portion originally wound up around the wind-up core, the term "tape roll" means the wind-up surface of the wind-up core.

In the magnetic tape wind-up method of the present invention, the rollers for control of the feed direction of the magnetic tape to the tape roll, control of the position of the magnetic tape in the tape width direction, and discharge of air between turns of the magnetic tape in the tape roll, which are necessary for improving the accuracy of decorative winding of the magnetic tape, are used independently. Therefore, it is possible to adjust the respective rollers, thereby improving the decorative winding accuracy, and to quickly wind up the magnetic tape around the wind-up core into a large diameter roll.

Also, with the magnetic tape wind-up apparatus of the present invention, it is possible to easily carry out the aforesaid magnetic tape wind-up method and to achieve quick winding up of the magnetic tape into a large diameter roll.

DESCRIPTION OF THE PREFERRED EMBODIMENT

The present invention will hereinbelow be described in further detail with reference to the accompanying drawings.

Figure 1:
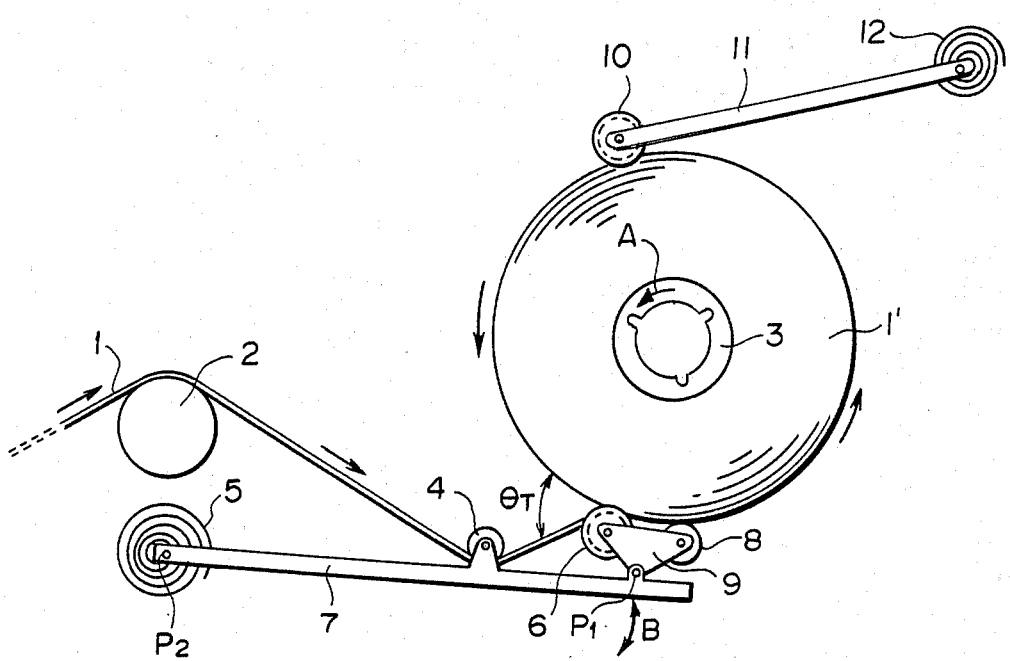
FIG. 1 is a schematic plan view showing an embodiment of the magnetic tape wind-up apparatus in accordance with the present invention.

Referring to FIG. 1, a magnetic tape 1 is cut by a slitter (not shown) into a tape form, fed via a guide roller 2, and wound up into a roll shape around a wind-up core 3, which is rotated in the direction as indicated by the arrow A, via a plurality of rollers as described later.

Figure 2:
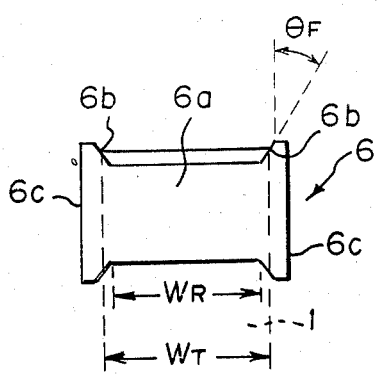
FIG. 2 is a side view showing the shape of the edge control roller used in the embodiment of FIG. 1.
Figure 3:
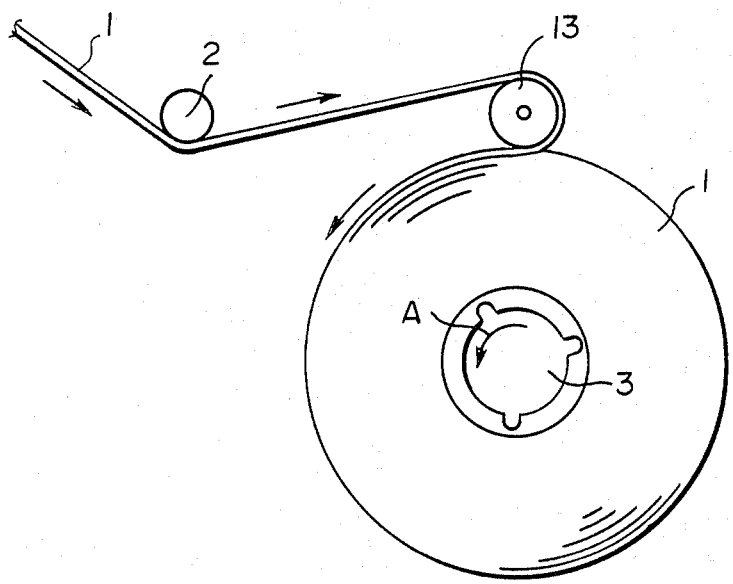
FIG. 3 is a schematic plan view showing the conventional magnetic tape wind-up apparatus.

Before the magnetic tape 1 arrives at a tape roll 1' already formed around the wind-up core 3, the movement direction of the magnetic tape 1 is changed by a position control roller 4 supported on a touch arm 7, and the feed direction of the magnetic tape 1 to the tape roll 1' is controlled. Further, at the position where the magnetic tape 1 arrives at the tape roll 1', the magnetic tape 1 is pushed against the tape roll 1' and the position thereof in the tape width direction is controlled by an edge control roller 6 which is a touch roller urged by a spring 5 via the touch arm 7 and a plate-like member 9 rotatably supported on the touch arm 7. As shown in FIG. 2, the edge control roller 6 comprises a shaft section 6a having a width WR smaller than the width WT of the magnetic tape 1, and flange sections 6c, 6c respectively having tapered inner surfaces 6b, 6b inclined so that the distance between the tapered surfaces 6b, 6b increases from the ends of the shaft section 6a toward outward. Side edges of the magnetic tape 1 contact the tapered surfaces 6b, 6b, and the position of the magnetic tape 1 in the tape width direction is thereby controlled. In order to substantially control the position of the magnetic tape 1 in the width direction and achieve the decorative winding at a high accuracy, an inclination $\theta F$ of each of the tapered surfaces 6b, 6b of the edge control roller 6 should preferably satisfy the condition $2° \leq \theta F \leq 15°$, and the ratio of the width WR of the shaft section 6a to the width WT of the magnetic tape 1 should preferably be approximately $WR/WT = 0.9$. Also, the feed direction of the magnetic tape 1 to the tape roll 1', which is controlled by the position control roller 4, should preferably be such that an angle $\theta T$ of the magnetic tape 1 with respect to the tape roll 1' satisfies the condition $10° \leq \theta T \leq 90°$.

The tapered surfaces 6b, 6b of the edge control roller 6 should be finishing by grinding to eliminate the problem that the magnetic tape 1 is adversely affected by friction with the tapered surfaces 6b, 6b. Further, since the purpose of the edge control roller 6 is to control the position of the magnetic tape 1 in the width direction, it is necessary to adjust the pushing force of the edge control roller 6 so that the magnetic tape 1 does not separate from the tape roll 1' due to rotation of the wind-up core 3. When the wind-up core 3 becomes slightly eccentric or is slightly deformed, it causes vibration of the edge control roller 6 during rotation. When the edge control roller 6 vibrates, the edge control effect is deteriorated markedly. The weight of the touch arm 7 should be decreased and the spring constant should be selected so that the edge control roller 6 exhibits the response characteristics of 60 Hz or higher. By way of example, in the case of a ½ inch magnetic tape, it was found that a wind-up speed of 600 m/minute is obtained by a pressing force of 100 g and an arm weight of 120 g.

While the magnetic tape 1 is present at the outermost circumference of the tape roll 1', the magnetic tape 1 is pressed by a push roller 8, and air present between the magnetic tape 1 and the tape roll 1' is removed. The push roller 8 is supported together with the edge control roller 6 on the plate-like member 9 rotatably supported around a support point P1 on the touch arm 7, and is urged by the spring 5 to push the magnetic tape 1 against the tape roll 1'. The pushing force of the push roller 8 should be larger than the pushing force of the edge control roller 6. For example, in the case of a magnetic tape having a width of ½ inch, the pushing force of the push roller 8 should preferably be selected from the range of 150 g to 350 g in accordance with the tape thickness. When the pushing force for the magnetic tape having a width of ½ inch is higher than 350 g, a rubbing pattern arises on the wound-up surface of the tape roll. Also, the surface of the push roller 8 should be finished at a high accuracy so that it uniformly contacts the magnetic tape 1. When the push roller 8 is constituted by a rubber roller or the like, it is necessary to select a material which does not generate rubber chips due to friction with the magnetic tape 1. Further, when the push roller 8 is constituted by a rubber roller, the width thereof should be slightly smaller than the width of the magnetic tape 1. This is because, if the former is larger than the latter, concave deformation arises on the roller surface, and a tape winding failure arises.

As the magnetic tape 1 is wound up around the windup core 3, the touch arm 7 on which the position control roller 4 is supported, and the edge control roller 6 and the push roller 8 are supported via the plate-like member 9 rotates in the direction as indicated by the arrow B around a supporting point P2 at the end portion where the spring 5 is present. Thus the edge control roller 6 and the push roller 8 always push the magnetic tape 1 against the tape roll 1' with an appropriate strength by the rotation of the touch arm 7 and minute rotation of the plate-like member 9 around the supporting point P1. The mechanism for urging the edge control roller 6 and the push roller 8 toward the tape roll 1' is not limited to the one shown in FIG. 1, and the edge control roller 6 and the push roller 8 may be independently urged by springs or the like.

Further, in the embodiment of FIG. 1, an auxiliary edge control roller 10 urged by a spring 12 via a touch arm 11 is positioned to approximately face the push roller 8 via the wind-up core 3. When, for example, the magnetic tape 1 is wound up into a large diameter roll around the wind-up core 3, the auxiliary edge control roller 10 supports the tape roll 1' and moderately controls the width of the tape roll 1'. The auxiliary edge control roller 10 comprises a shaft section having a width slightly larger than the width of the magnetic tape 1, and flange sections. The auxiliary edge control roller 10 is used for the case where the wind-up apparatus should increase the wind-up speed of the magnetic tape 1, and need not always be provided when the magnetic tape 1 is not wound into a large diameter roll.

In the magnetic tape wind-up apparatus of the present invention, the conditions necessary for achieving decorative winding of the magnetic tape at a high accuracy, i.e. the control of the feed direction of the magnetic tape to the tape roll, the control of the position of the magnetic tape in the width direction, and discharging of air between the turns of the magnetic tape in the tape roll, are adjusted most appropriately by the rollers provided independently. Therefore, the wind-up accuracy is markedly improved over the accuracy with the conventional magnetic tape wind-up method. Accordingly, it is possible to wind up the magnetic tape up to a diameter larger than the roll diameter which was possible with the conventional magnetic tape wind-up method, and to increase the wind-up speed. For example, when a video magnetic tape having a thickness of 19$\mu$ and a width of ½ inch is wound up around the wind-up core by the conventional method, winding up is possible up to a roll diameter of 280 mm at a wind-up speed of 200 m/minute, and the surface roughness of the wound-up tape roll is within the range of 50$\mu$ to 80$\mu$. On the other hand, when the same magnetic tape is wound up by the method of the present invention, winding up is possible up to a roll diameter of 360 mm at a wind-up speed of 600 m/minute, and the surface roughness of the wound-up tape roll is within the range of 20$\mu$ to 50$\mu$. By "surface roughness" is meant the maximum extent Rmax of deviation in tape overlapping at the wound-up surface of the pancake.

We claim:

1. A magnetic tape wind-up method for winding up a magnetic tape into a roll shape around a wind-up core, which comprises the steps of:
   (i) controlling a feed direction of said magnetic tape to a tape roll, which is formed by winding up of a preceding portion of said magnetic tape around said wind-up core, by a position control roller before said magnetic tape arrives at said tape roll,
   (ii) controlling the lateral position of said magnetic tape in the tape width direction an edge control roller at a position where said magnetic tape arrives at said tape roll, said edge control roller having a cylindrical shaft section and flanges at each end of said cylindrical shaft section said cylindrical shaft section being slightly narrower than the width of said tape, and
   (iii) discharging air between turns of said magnetic tape in said tape roll by pushing said magnetic tape against said tape roll by use of a push roller while said magnetic tape is present at the outermost circumference of said tape roll.

2. A method as defined in claim 1 wherein said feed direction of said magnetic tape to said tape roll is controlled so that an angle $\theta T$ exists between a line coincident with said feed direction of said magnetic tape and a tangent line on the outermost circumference of said tape roll at the point of intersection of said line coincident with said feed direction with the outermost circumference of said tape roll, where said angle $\theta T$ satisfies the condition $10° \leq \theta T \leq 90°$.

3. A method as defined in claim 1 or 2 wherein the width of said tape roll is moderately controlled by an auxiliary edge control roller positioned approximately diametrically opposite said push roller via said wind-up core.

4. The magnetic tape wind-up method as defined in claim 1, wherein said edge control roller pushes with a first force, and said push roller pushes with a second force which is larger than said first force of said edge control roller.

5. A magnetic tape wind-up apparatus for winding up a magnetic tape into a roll shape around a wind-up core, which comprises:
   (i) a position control roller for contacting said magnetic tape and controlling a feed direction of said magnetic tape to a tape roll, which is formed by winding up of a preceding portion of said magnetic tape around said wind-up core, at a position prior to arrival of said magnetic tape arrives at said tape roll,
   (ii) an edge control roller for contacting said magnetic tape at an arrival position of said magnetic tape and controlling the lateral position of said magnetic tape in the tape width direction, said edge control roller, having a cylindrical shaft section and flanges at each end of said cylindrical shaft section, said cylindrical shaft section being slightly narrower than the width of said tape, and
   (iii) push roller for pushing said magnetic tape against said tape roll and discharging air between turns of said magnetic tape in said tape roll while said magnetic tape is present at the outermost circumference of said tape roll.

6. An apparatus as defined in claim 4 wherein said edge control roller haul tapered inner surfaces inclined so that the distance between said tapered inner surfaces increased radially outwardly from said shaft section.

7. An apparatus as defined in claim 6 wherein the inclination $\theta F$ of said tapered inner surfaces satisfies the condition $2° \leq \theta F \leq 15°$, wherein $\theta F$ is the angle between the tapered inner surfaces and a plane perpendicular to the axis of the edge control roller.

8. An apparatus as defined in claim 6 or 7 wherein the ratio of the width WR of said shaft section to the width WT of said magnetic tape is approximately WR/WT=0.9.

9. An apparatus as defined in claim 5 further comprising an auxiliary edge control roller positioned approximately diametrically opposite said push roller via said wind-up core.

10. The magnetic tape wind-up apparatus defined in claim 5 further comprising means for pushing said edge control roller against said magnetic tape and means for pushing said press roller against said magnetic tape with a force larger than pushing force applied by said means for pushing said edge control roller.

11. The magnetic tape wind-up apparatus defined in claim 5, wherein said flanged edge control roller and said press roller are supported together on a rotatable member rotatably supported at a support point positioned between said edge control roller and said push roller.

12. The magnetic wind-up apparatus defined in claim 5, wherein said push roller has a width slightly smaller than the width of said tape.

13. A magnetic tape wind-up method for winding up a magnetic tape into a roll shape around a wind-up core, which comprises the steps of:
  (i) controlling a feed direction of said magnetic tape to a tape roll, which is formed winding up of a preceding portion of said magnetic tape around said wind-up core, by a position control roller before said magnetic tape arrives at said tape roll,
  (ii) controlling the lateral position of said magnetic tape in the tape width direction at a position where said magnetic tape arrives at said tape roll by a means of a flanged edge control roller supported on a rotatable member rotatably supported at a support point between said flanged edge control roller and a push roller in contact with the tape wound on said tape roll said flanged edge control roller having a cylindrical shaft section and flanges at each end of said cylindrical shaft section, said cylindrical shaft section being slightly narrower than the width of said tape. and
  (iii) discharging air between turns of said magnetic tape in said tape roll by pushing said magnetic tape against said tape roll by use of said push roller while said magnetic tape is present at the outermost circumference of said tape roll.

14. A magnetic tape wind-up method for winding up a magnetic tape into a roll shape around a wind-up core, which comprises the steps of:
  (i) controlling a feed direction of said magnetic tape to a tape roll, which is formed by winding up of a preceding portion of said magnetic tape around said wind-up core, by a position control roller before said magnetic tape arrives at said tape roll,
  (ii) controlling the lateral position of said magnetic tape in the tape width direction at a position where said magnetic tape arrives at said tape roll by a means of a flanged edge control roller said flanged edge control roller having a cylindrical shaft section and flanges at each end of said cylindrical shaft section, said cylindrical shaft section being slightly narrower than the width of said tape. and
  (iii) discharging air between turns of said magnetic tape in said tape roll by pushing said magnetic tape against said tape roll by use of a push roller having a width slightly smaller than width of said magnetic tape while said magnetic tape is present at the outermost circumference of said tape roll.

* * * * *